United States Patent
Takeda et al.

(10) Patent No.: US 9,728,834 B2
(45) Date of Patent: Aug. 8, 2017

(54) CONNECTOR APPARATUS AND WIRELESS TRANSMISSION SYSTEM

(71) Applicant: SONY SEMICONDUCTOR SOLUTIONS CORPORATION, Kanagawa (JP)

(72) Inventors: Takahiro Takeda, Kanagawa (JP); Yasuhiro Okada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/783,896

(22) PCT Filed: Mar. 27, 2014

(86) PCT No.: PCT/JP2014/058969
§ 371 (c)(1),
(2) Date: Oct. 12, 2015

(87) PCT Pub. No.: WO2014/174983
PCT Pub. Date: Oct. 30, 2014

(65) Prior Publication Data
US 2016/0072174 A1    Mar. 10, 2016

(30) Foreign Application Priority Data

Apr. 22, 2013  (JP) ................. 2013-089002

(51) Int. Cl.
*H04B 5/00*  (2006.01)
*H01P 5/107*  (2006.01)
(Continued)

(52) U.S. Cl.
CPC ........... *H01P 5/02* (2013.01); *H01P 3/026* (2013.01); *H01P 5/107* (2013.01); *H01Q 9/285* (2013.01);
(Continued)

(58) Field of Classification Search
CPC .................... H04B 5/00; H01P 5/107
See application file for complete search history.

(56) References Cited

U.S. PATENT DOCUMENTS 5,812,034 A    9/1998  Yoshida
5,923,295 A *  7/1999  Nakano ................ H01Q 1/38
                                                343/700 MS
(Continued)

FOREIGN PATENT DOCUMENTS

| JP | 5-206710 A | 8/1993 |
|---|---|---|
| JP | 5-251928 A | 9/1993 |
| JP | 3169972 | 5/2001 |

OTHER PUBLICATIONS

International Search Report prepared by the Japanese Patent Office on Jun. 17, 2014, for International Application No. PCT/JP2014/058969.

*Primary Examiner* — Cindy Trandai
(74) *Attorney, Agent, or Firm* — Sheridan Ross P.C.

(57) ABSTRACT

A connector apparatus includes a first connector unit provided at an end section of a waveguide cable and a second connector unit that is provided at a terminal section of a transmission wire formed on a print substrate and is detachable from the first connector unit, the second connector unit being structured to perform a signal transmission with the first connector unit by an electromagnetic induction.

17 Claims, 12 Drawing Sheets

(51) Int. Cl.
*H01P 5/02* (2006.01)
*H01Q 9/28* (2006.01)
*H01P 3/02* (2006.01)
*H01R 12/70* (2011.01)
*H04B 3/52* (2006.01)

(52) U.S. Cl.
CPC ........... *H01R 12/7076* (2013.01); *H04B 3/52* (2013.01); *H04B 5/0075* (2013.01)

(56) References Cited

U.S. PATENT DOCUMENTS

| | | | |
|---|---|---|---|
| 2002/0130808 A1* | 9/2002 | Fukushima | H01P 1/067 342/75 |
| 2009/0115670 A1* | 5/2009 | Nysen | H01Q 1/2275 343/702 |
| 2010/0231320 A1* | 9/2010 | Kawamura | H01L 23/66 333/33 |
| 2011/0026443 A1* | 2/2011 | Okada | H01P 1/17 370/280 |
| 2011/0095385 A1* | 4/2011 | Kawamura | H01L 23/645 257/428 |
| 2011/0158344 A1* | 6/2011 | Kawamura | H01P 1/047 375/295 |
| 2012/0093041 A1* | 4/2012 | Takeda | H01P 1/06 370/280 |
| 2012/0194303 A1 | 8/2012 | Pettus et al. | |
| 2013/0109317 A1* | 5/2013 | Kikuchi | H04B 7/24 455/41.2 |

\* cited by examiner

FIG.1A
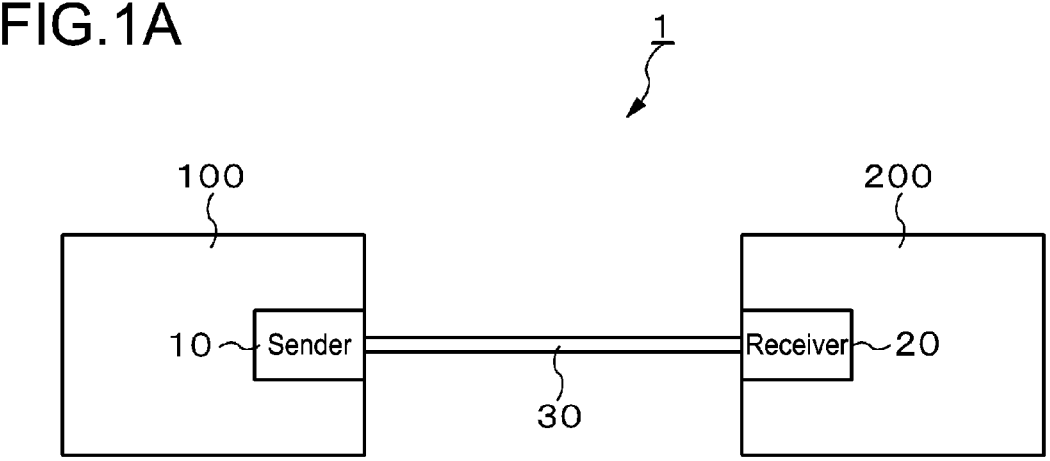
FIG.1B
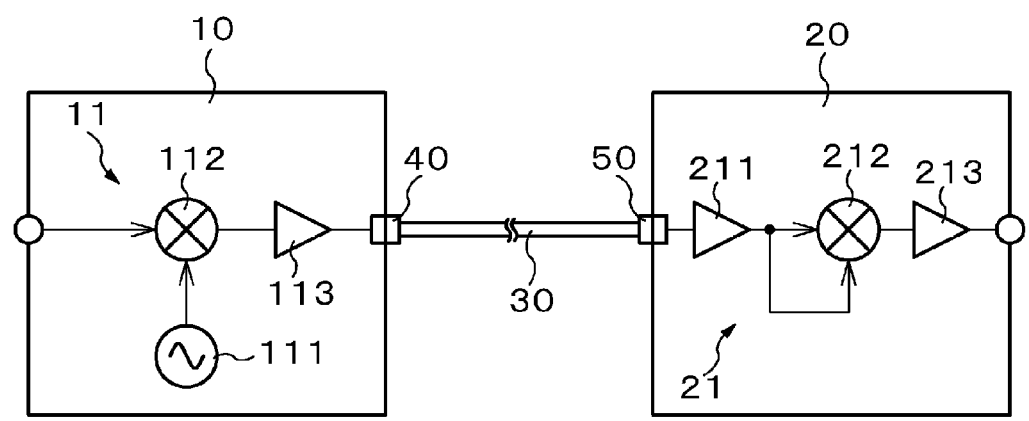
FIGS.1

FIG.5A
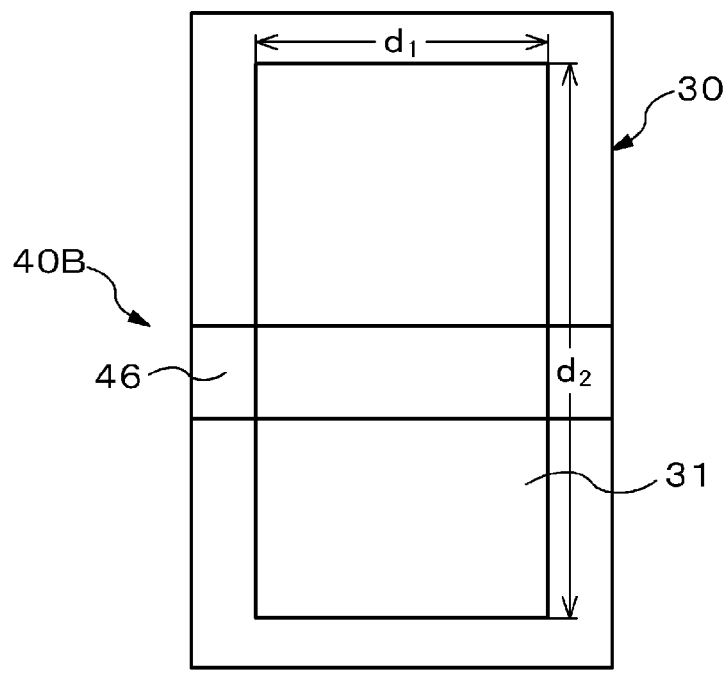
FIG.5B
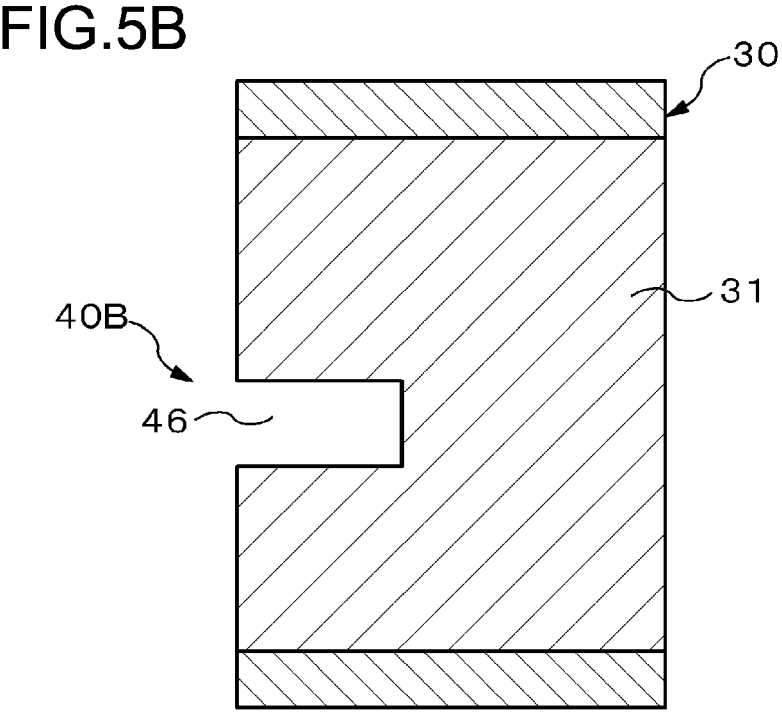
FIGS.5

FIG.7A
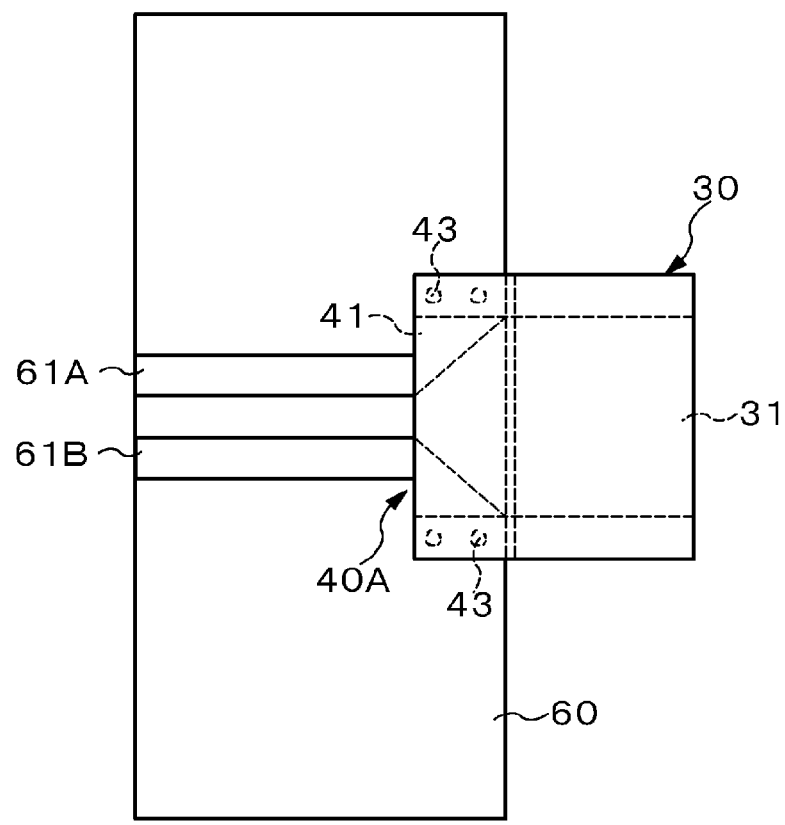
FIG.7B
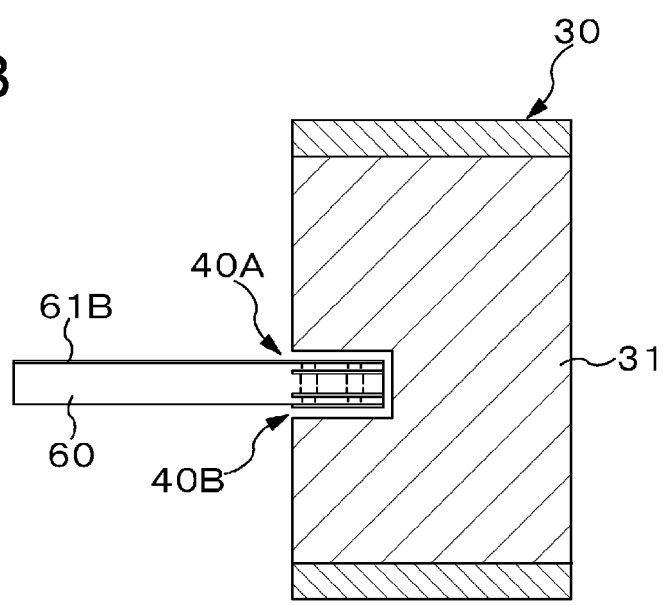
FIGS.7

FIG.8A
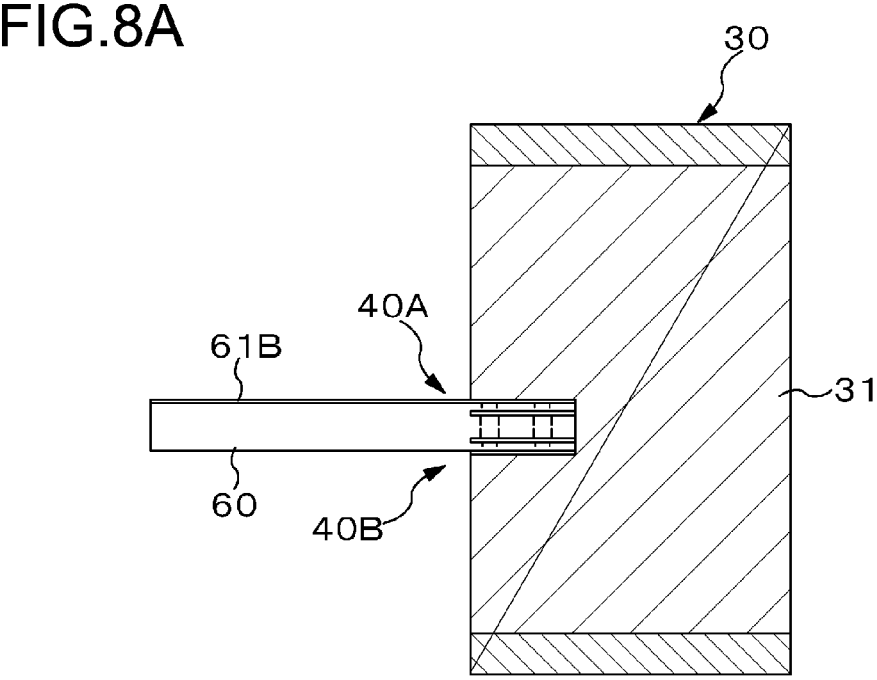
FIG.8B
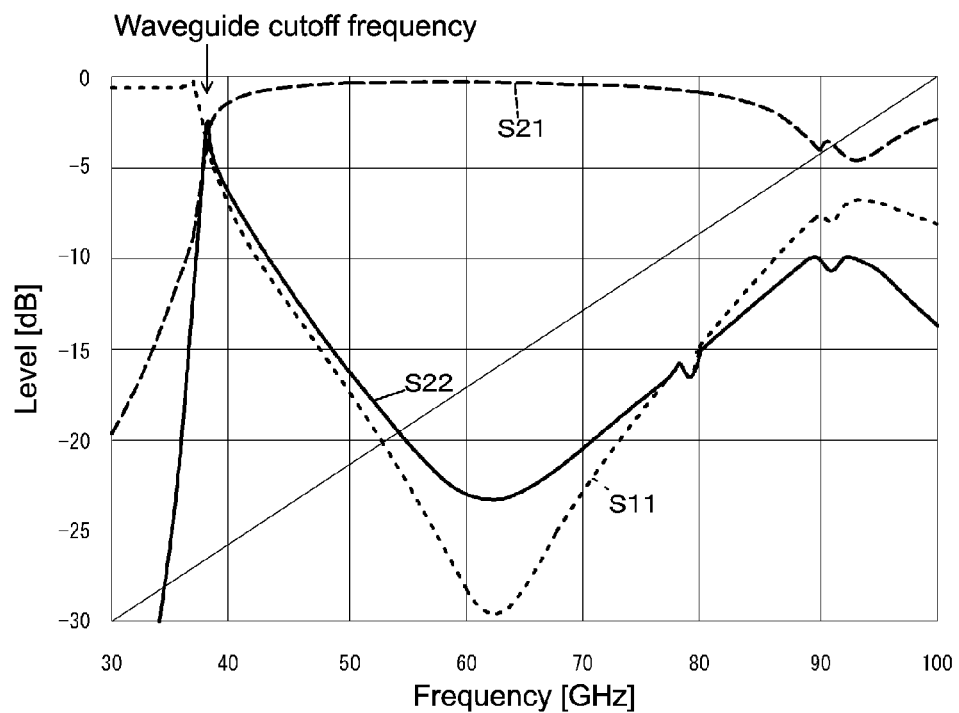
FIGS.8

FIG.9A
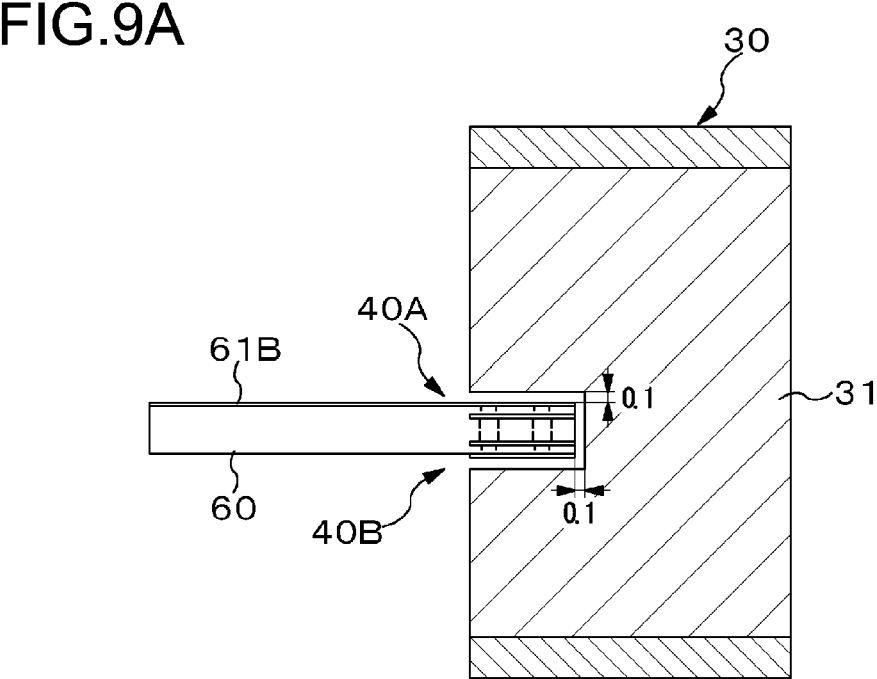
FIG.9B
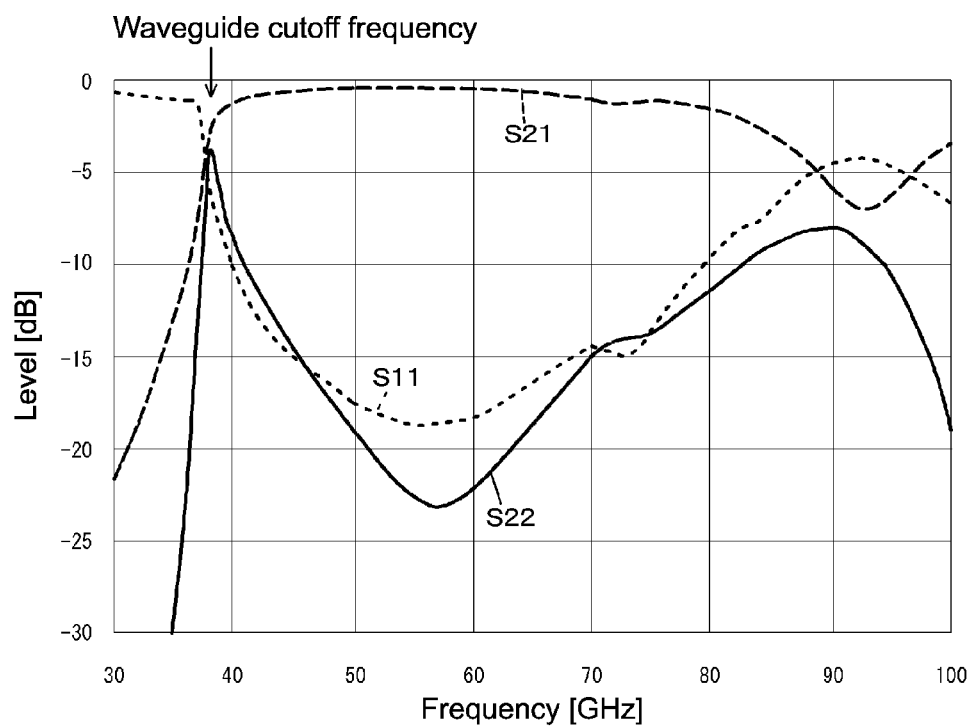
FIGS.9

FIG.12A
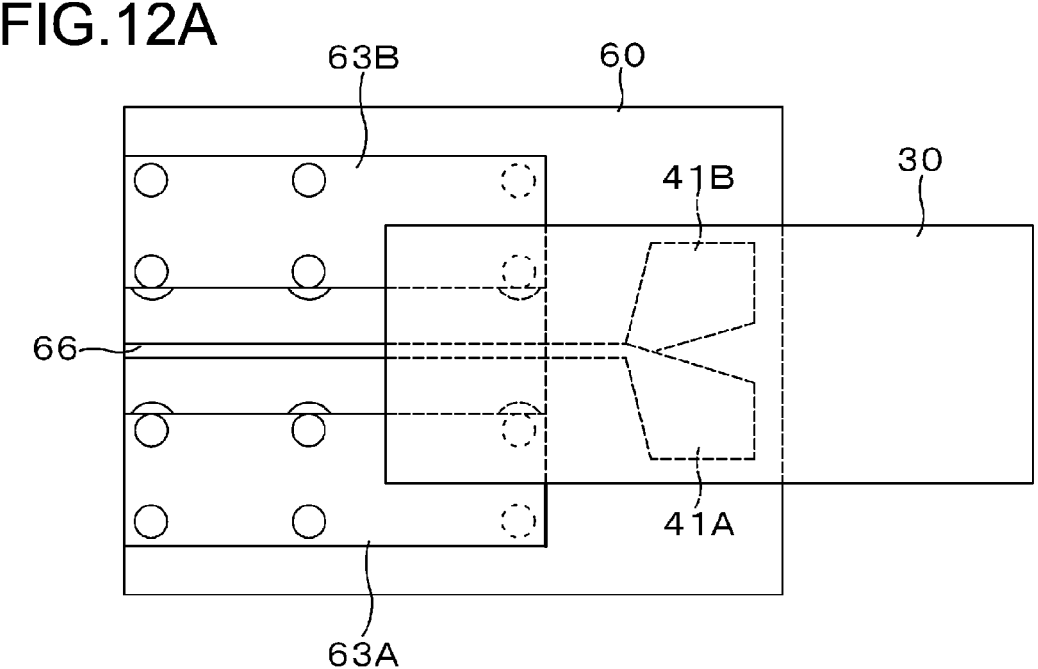
FIG.12B
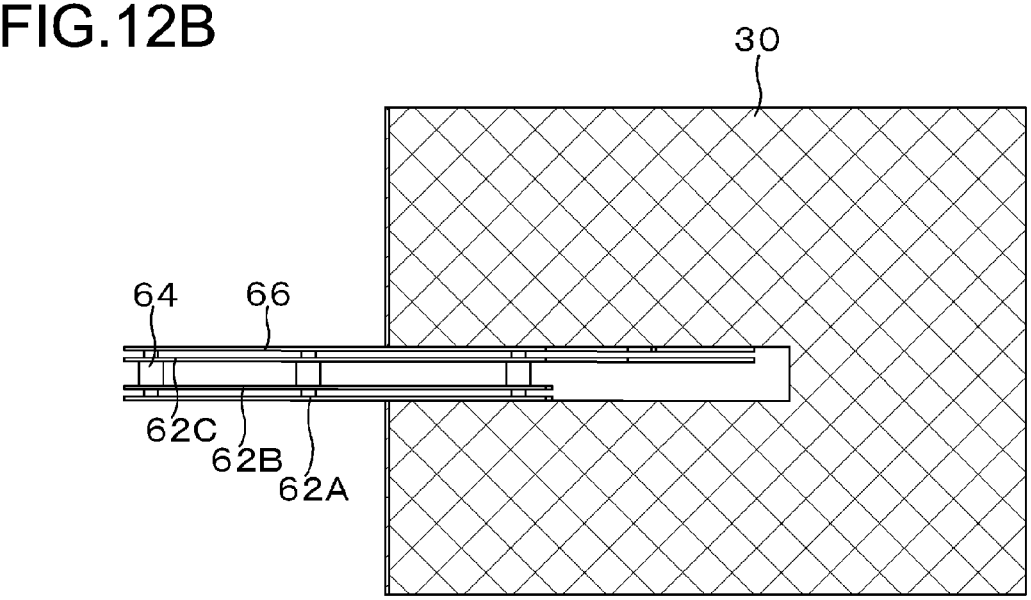
FIGS.12

CONNECTOR APPARATUS AND WIRELESS TRANSMISSION SYSTEM

CROSS REFERENCE TO RELATED APPLICATIONS

This application is a national stage application under 35 U.S.C. 371 and claims the benefit of PCT Application No. PCT/JP2014/058969 having an international filing date of Mar. 27, 2014, which designated the United States, which PCT application claimed the benefit of Japanese Patent Application No. 2013-089002 filed Apr. 22, 2013, the disclosures of which are incorporated herein by reference in their entirety.

TECHNICAL FIELD

The present disclosure relates to a connector apparatus and a wireless transmission system.

BACKGROUND ART

In a system in which a waveguide cable transmits high-frequency signals such as millimeter-wave signals and microwave signals, it is necessary to connect a feeder wire on a circuit board and a waveguide cable. In the past, this connection has been established by using a waveguide-microstrip line converter, which includes a short stub of ¼ wavelength (approximately) that is made of antipodal lines and short-circuited on a tube wall of the waveguide (see, for example, Patent Document 1).

Patent Document 1: Japanese Patent No. 3169972

SUMMARY OF INVENTION

Problem to be Solved by the Invention

In the related art such as the waveguide-microstrip line converter of Patent Document 1, the connection section between a feeder wire on a circuit board and a waveguide cable is fixed, so it is not possible to connect the feeder wire and the waveguide cable or to disconnect them arbitrarily (freely). On the other hand, depending on a system that transmits millimeter-wave or microwave signals, it may be convenient to have a structure that allows the connection section between the circuit board side and the waveguide cable side to be connected and disconnected arbitrarily.

The present disclosure aims at providing a connector apparatus capable of arbitrarily connecting/disconnecting a circuit board side to/from a waveguide cable side, and a wireless transmission system including the connector apparatus.

Means for Solving the Problem

To attain the object described above, according to a first mode of the present disclosure, there is provided a connector apparatus including a connector unit that is provided at a terminal section of a feeder wire formed on a circuit board and is detachable from an end section of a waveguide cable, the connector unit being structured to perform a signal transmission with the end section of the waveguide cable by an electromagnetic induction.

Further, to attain the object described above, according to a second mode of the present disclosure, there is provided a connector apparatus including:

a first connector unit provided at an end section of a waveguide cable; and a second connector unit that is provided at a terminal section of a feeder wire formed on a circuit board and is detachable from the first connector unit, the second connector unit being structured to perform a signal transmission with the first connector unit by an electromagnetic induction.

Furthermore, to attain the object described above, according to the present disclosure, there is provided a wireless transmission system including:

a sender that transmits a high-frequency signal;

a receiver that receives the high-frequency signal;

a waveguide cable that transmits the high-frequency signal between the sender and the receiver; and a connector apparatus that connects at least one of the sender and the receiver with the waveguide cable, the connector apparatus including a first connector unit provided at an end section of the waveguide cable, and a second connector unit that is provided at a terminal section of a feeder wire formed on a circuit board and is detachable from the first connector unit in at least one of the sender and the receiver, the second connector unit being structured to perform a signal transmission with the first connector unit by an electromagnetic induction.

In the thus-structured connector apparatuses according to the modes or the wireless transmission system including the connector apparatus, the connector unit on the feeder wire side on the circuit board is detachable from the connector unit on the waveguide cable side. Accordingly, it becomes possible to arbitrarily connect/disconnect the feeder wire on the circuit board and the waveguide cable. The term "detachable" used herein conceptually includes "easiness to detach", which means that it takes less trouble to connect (attach) them or disconnect (detach) them. Therefore, the term "detachable" defined herein does not conceptually include, for example, a coaxial connector apparatus, which is attached or detached by using screw-type fixing members or the like.

Effect of the Invention

According to the present disclosure, because the connector apparatus is detachably interposed between the feeder wire on the circuit board and the waveguide cable, it is possible to connect/disconnect the circuit board side to/from the waveguide cable side arbitrarily.

It should be noted that the effects described in the specification are mere examples, the effects are not limited to them, and additional effects may be obtained.

BRIEF DESCRIPTION OF DRAWINGS

FIG. 1A is a block diagram showing an example of a structure of a wireless transmission system to which the technique of the present disclosure is applied, and FIG. 1B is a block diagram showing an example of a specific structure of a sender and a receiver of the wireless transmission system.

FIG. 5A is a front view of the connector apparatus according to Example 2, and FIG. 5B is a side cross-sectional diagram of the connector apparatus according to Example 2.

FIG. 7A is a plan view showing the coupling section of the first connector unit and the second connector unit, and FIG. 7B is a side cross-sectional diagram of the coupling section of the first connector unit and the second connector unit.

FIG. 8A is a side cross-sectional diagram showing the coupling section when a gap between an inner wall of a concave section of a waveguide and a circuit board is 0 [mm], and FIG. 8B is a characteristics diagram showing coupling characteristics at this time.

FIG. 9A is a side cross-sectional diagram showing the coupling section when the gap between the inner wall of the concave section of the waveguide and the circuit board is 0.1 [mm], and FIG. 9B is a characteristics diagram showing the coupling characteristics at this time.

FIG. 12A is a front view of the connector apparatus according to Example 3, and FIG. 12B is a side cross-sectional diagram of the connector apparatus according to Example 3.

MODES FOR CARRYING OUT THE INVENTION

Figure 2:
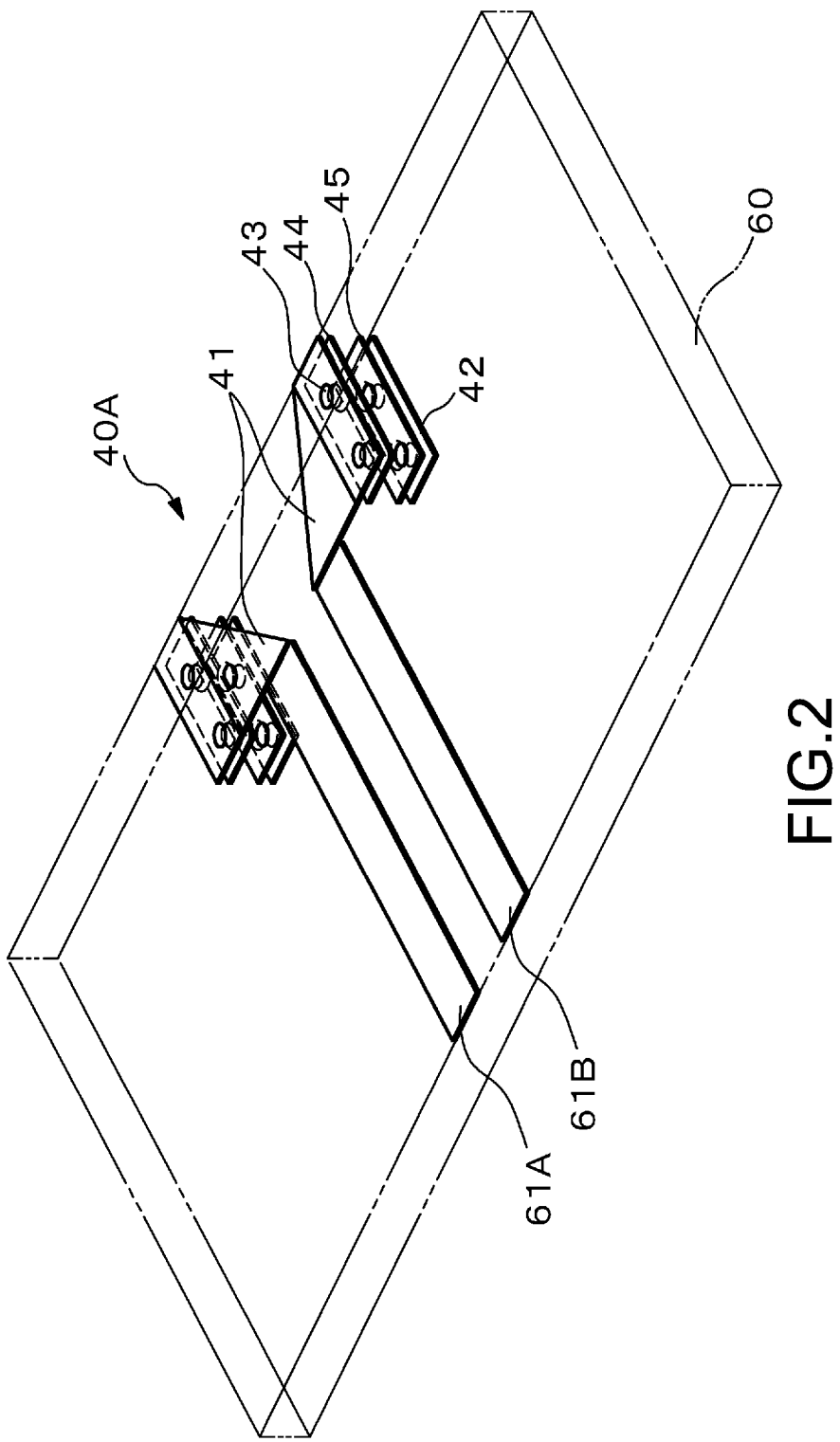
FIG. 2 is a perspective view schematically showing a structure of a connector apparatus according to Example 1.

Hereinafter, structures for embodying the technique of the present disclosure (hereinafter referred to as "embodiment") will be described in detail with reference to the drawings. The present disclosure is not limited to the embodiment, and various numerical values, materials, and the like of the embodiment are mere examples. In the following descriptions, the same elements or elements having the same function will be denoted by the same reference symbols, and overlapping descriptions will be omitted. It should be noted that the descriptions will be given in the following order.
1. General description of connector apparatus and wireless transmission system of present disclosure
2. Wireless transmission system to which technique of present disclosure is applied
3. Connector apparatus according to embodiment
   3-1. Example 1 (example of connector apparatus on circuit board side: coplanar strip waveguide)
   3-2. Example 2 (connector apparatus in which circuit board side and waveguide cable side is combined)
   3-3. Modified example
   3-4. Example 3 (example of connector apparatus on circuit board side: microstrip line)

<General Description of Connector Apparatus and Wireless Transmission System of Present Disclosure>

A wireless transmission system which is configured to transmit electromagnetic waves, particularly high-frequency signals such as microwaves, millimeter waves, and terahertz waves, via a waveguide as a medium, is preferably used to transmit signals among various apparatuses such as electronic apparatuses, information processing apparatuses, and semiconductor apparatuses, and to transmit signals among circuit boards in a single apparatus. In the wireless transmission system, a waveguide that transmits high-frequency signals is referred to as waveguide cable since it functions as a cable that connects apparatuses or circuit boards.

For example, millimeter waves out of high-frequency waves are radio waves having a frequency of 30 [GHz] to 300 [GHz] (wavelength is 1 [mm] to 10 [mm]). If millimeter-waveband signals are transmitted, it becomes possible to transmit signals at a high speed of a Gbps order (e.g., 5 [Gbps] or more). Example of a signal that is required to be transmitted at a high speed of a Gbps order include data signals of cinema videos, computer images, and the like. Further, the transmission of millimeter-waveband signals has advantages that interference immunity is excellent and that it does not adversely affect other electric wiring in a cable connection between apparatuses.

In the wireless transmission system that transmits, for example, millimeter-waveband signals out of high-frequency signals, a waveguide cable may be constituted of a hollow waveguide or a dielectric waveguide. It is desirable to use a dielectric waveguide since it has more flexibility than a hollow waveguide. In a dielectric waveguide, electromagnetic waves form an electromagnetic field according to a wavelength (frequency) or the like and propagate in the dielectric at the same time.

In the wireless transmission system that uses the waveguide cable, the circuit board is connected to the waveguide cable or the waveguide cable is connected to the circuit board via the connector apparatus. In this specification, a connector apparatus according to a first mode means a connector apparatus including a connector unit on the circuit board side, and a connector apparatus according to a second mode means a connector apparatus including a connector unit on the waveguide cable side (first connector unit) and a connector unit on the circuit board side (second connector unit).

In the connector apparatus according to the first mode of the present disclosure, a concave section (notched section) is formed at an end section of the waveguide cable, and the connector unit can detachably fit in the concave section.

In the connector apparatus according to the second mode of the present disclosure, the waveguide may have a rectangular cross-section perpendicular to a waveguide direction, and two surfaces on a side of long sides of the cross-section may be surfaces that intersect an electric field. Further, the second connector unit may be coupled with the first connector unit such that a surface of the circuit board intersects the two surfaces on the side of the long sides. At this time, the first connector unit may be constituted of a concave section formed at the end section of the waveguide cable so as to intersect the two surfaces on the side of the long sides, and the second connector unit can detachably fit in the concave section. Moreover, the waveguide cable excluding an opening section that couples the first connector unit and the second connector unit may be blocked by metal.

In the connector apparatuses according to the first and second modes of the present disclosure including the favorable structures and forms described above, the connector unit (second connector unit) includes a conductive opening pattern section that gradually widens from the terminal of the feeder wire toward an edge section of the circuit board. At this time, the opening pattern section may be tapered, for example.

In the connector apparatuses according to the first and second modes of the present disclosure including the favorable structures and forms described above, an opening pattern section may be structured such that a length from the terminal of the feeder wire to an opening end is determined based on a wavelength of radio waves in the circuit board.

At this time, the opening pattern section may be structured such that the length from the terminal of the feeder wire to the opening end becomes substantially ¼ the wavelength of radio waves in the circuit board.

In the connector apparatuses according to the first and second modes of the present disclosure including the favorable structures and forms described above, an opening pattern section may be structured such that an opening width of an opening end is determined based on a size of the waveguide cable.

In the connector apparatuses according to the first and second modes of the present disclosure including the favorable structures and forms described above, two feeder wires may be provided, and an interval between the two feeder wires and a line width of the feeder wires may be set based on a characteristic impedance of the waveguide cable or may be adjusted based on a thickness and relative permittivity of the circuit board. Further, the two feeder wires may form a coplanar strip waveguide.

Alternatively, in the connector apparatuses according to the first and second modes of the present disclosure including the favorable structures and forms described above, an opening pattern section may be electrically connected, via a through hole, to a conductive pattern section formed on the circuit board on the other side of a side on which the opening pattern section is formed. At this time, the opening pattern section may include at least one layer of a conductive pattern section that is formed inside the circuit board and is electrically connected to the opening pattern section via a through hole.

Alternatively, in the connector apparatuses according to the first and second modes of the present disclosure including the favorable structures and forms described above, the feeder wire may form a microstrip line.

<Wireless Transmission System to which Technique of Present Disclosure is Applied>

With reference to FIGS. 1A and 1B, an example of a structure of a wireless transmission system to which the technique of the present disclosure is applied will be described. FIG. 1A is a block diagram showing an example of the structure of the wireless transmission system to which the technique of the present disclosure is applied, and FIG. 1B is a block diagram showing an example of a specific structure of a sender and a receiver in the wireless transmission system.

As shown in FIG. 1, the wireless transmission system 1 of this application example includes a sender 10 that transmits high-frequency signals, a receiver 20 that receives the high-frequency signals, and a dielectric waveguide cable (dielectric waveguide) 30 that transmits the high-frequency signals between the sender 10 and the receiver 20.

Here, the wireless transmission system which transmits, for example, millimeter-waveband signals out of the high-frequency signals by using the waveguide cable is exemplified. The waveguide cable may be constituted of a hollow waveguide or a dielectric waveguide.

Incidentally, the use of millimeter-waveband signals (millimeter-wave communication) as the high-frequency signals has the advantages as follows.

a) Because a communication band of the millimeter-wave communication is wide, it is easy to make a data rate higher.
b) It is possible to separate a frequency used for the transmission from frequencies of other baseband signal processing, and therefore the frequency of millimeter waves rarely interfere with the frequency of baseband signals.
c) Because the wavelength of millimeter wavebands is short, it is possible to make the waveguide structure that is determined based on the wavelength small. In addition, because a distance attenuation is large and there are less diffractions, it is easy to perform an electromagnetic shield.
d) In general wireless communication, stability of carrier waves is strictly regulated in order to prevent interference and the like from occurring. In order to realize such carrier waves high in stability, external frequency reference components, multiplier circuits, PLLs (phase lock loop circuits), and the like that are high in stability are used, and therefore the circuit is made larger in size. In contrast, in the millimeter-wave communication, it is possible to prevent leakage to an outside from occurring easily, carrier waves low in stability can be used for the transmission, and it is therefore possible to prevent the size of the circuit from increasing.

In the wireless transmission system 1 of this application example that transmits millimeter-waveband signals, the sender 10 carries out processing of converting transmission target signals into millimeter-wave signals and outputting the millimeter-wave signals to the waveguide cable 30. The receiver 20 carries out processing of receiving the millimeter-wave signals transmitted through the waveguide cable 30 and restoring the millimeter-wave signals to the original transmission target signals.

In this application example, the sender 10 is provided inside a first communication apparatus 100, and the receiver 20 is provided inside a second communication apparatus 200. In this case, the waveguide cable 30 transmits high-frequency signals between the first communication apparatus 100 and the second communication apparatus 200. In the communication apparatuses 100 and 200 that exchange signals via the waveguide cable 30, the sender 10 and the receiver 20 are arranged in a pair. A signal transmission method between the first communication apparatus 100 and the second communication apparatus 200 may be a unidirectional (one-way) transmission method or a bidirectional transmission method.

The sender 10 (first communication apparatus 100) and the receiver 20 (second communication apparatus 200) are arranged in a predetermined area. Here, because the high-frequency signals are millimeter-wave signals, it is only necessary for the "predetermined area" to be an area in which a millimeter-wave transmittable area can be restricted. Typically, a distance of the "predetermined area" is smaller than distances between communication apparatuses used for broadcasting and in general wireless communication.

As the structure in which the sender 10 and the receiver 20 are arranged in the predetermined area, the following structure can be exemplified in addition to the arrangement in different communication apparatuses (electronic apparatuses), that is, the first communication apparatus 100 and the second communication apparatus 200, as shown in FIG. 1A. For example, a structure in which the sender 10 and the receiver 20 are arranged on separate circuit boards in a single electronic apparatus is conceivable. In the case of this arrangement, one of the circuit boards corresponds to the first communication apparatus 100, and the other one of the circuit boards corresponds to the second communication apparatus 200.

In addition, a structure in which the sender 10 and the receiver 20 are arranged on separate semiconductor chips in a single electronic apparatus is also conceivable. In the case of this structure, one of the semiconductor chips corresponds to the first communication apparatus 100, and the other one of the semiconductor chips corresponds to the second communication apparatus 200. Further, a structure in which the sender 10 and the receiver 20 are arranged in separate circuit sections on a single circuit board is also conceivable. In the case of this structure, one of the circuit sections corresponds to the first communication apparatus 100, and the other one of the circuit sections corresponds to the second communication apparatus 200. It should be noted that the structure is not limited to those described above.

On the other hand, as the combination of the first communication apparatus 100 and the second communication apparatus 200, there are the following combinations, for example. It should be noted that the following combinations are mere examples, and the combination is not limited to those combinations.

When the second communication apparatus 200 is a battery-powered apparatus such as a mobile phone, a digital camera, a video camera, a game machine, and a remote controller, the first communication apparatus 100 is an apparatus called base station that charges its battery, carries out image processing, and the like. Alternatively, when the second communication apparatus 200 has a relatively-thin appearance such as an IC card, the first communication apparatus 100 is a card reader/writer apparatus therefor. Further, the card reader/writer apparatus is used with, for example, an electronic apparatus body of a digital recording/reproducing apparatus, a terrestrial television receiver, a mobile phone, a game machine, a computer, and the like. Further, in the case of an application to an image pickup apparatus, for example, the first communication apparatus 100 is on a main substrate side and the second communication apparatus 200 is on an image pickup substrate side, and the apparatuses perform a signal transmission within a single apparatus (device).

Next, with reference to FIG. 1B, a specific structural example of the sender 10 and the receiver 20 will be described.

The sender 10 includes, for example, a signal generator 11 that processes transmission target signals and generates millimeter-wave signals. The signal generator 11 is a signal converter that converts the transmission target signals into millimeter-wave signals, and is constituted of, for example, an ASK (Amplitude Shift Keying) modulation circuit. Specifically, the signal generator 11 multiplies, by a multiplier 112, millimeter-wave signals supplied from an oscillator 111 by the transmission target signals to generate ASK modulation waves of the millimeter waves, and outputs the obtained waves via a buffer 113. A connector apparatus 40 is interposed between the sender 10 and the waveguide cable 30.

On the other hand, the receiver 20 includes, for example, a signal decoder 21 that processes millimeter-wave signals supplied via the waveguide cable 30 and restores the signals to the original transmission target signals. The signal decoder 21 is a signal converter that converts the received millimeter-wave signals into the original transmission target signals and is constituted of, for example, a square-law (squaring) detector circuit. Specifically, the signal decoder 21 squares, by a multiplier 212, millimeter-wave signals (ASK modulation waves) supplied via a buffer 211 to convert the millimeter-wave signals into transmission target signals, and outputs the transmission target signals via a buffer 213. A connector apparatus 50 is interposed between the waveguide cable 30 and the receiver 20.

The waveguide cable 30 has a waveguide structure for transmitting millimeter waves while confining them in the waveguide and has characteristics of efficiently transmitting millimeter-waveband electromagnetic waves. When the waveguide cable 30 is constituted of a dielectric waveguide, for example, it is favorable to use a dielectric waveguide including a dielectric material having a relative permittivity of a certain range and a dielectric tangent of a certain range.

Here, with regard to the "certain range", the relative permittivity or dielectric tangent of the dielectric material only needs to be within a range in which a desired effect can be obtained and only needs to be set to a predetermined value within that range. It should be noted that the characteristics of the dielectric waveguide are determined based on not only the dielectric material itself but also a length of a transmission path and the frequency (wavelength) of millimeter waves. Therefore, while the relative permittivity and the dielectric tangent of the dielectric material are not always determined clearly, they can be determined as follows, for example.

In order to transmit millimeter-wave signals in the dielectric waveguide at a high speed, it is favorable for the relative permittivity of the dielectric material to be about 2 to 10 (favorably, 3 to 6) and the dielectric tangent to be about 0.00001 to 0.01 (favorably, 0.00001 to 0.001). Examples of the dielectric materials that satisfy such conditions include dielectric materials formed of an acrylic resin, a urethane resin, an epoxy resin, silicone, polyimide, and a cyanoacrylate resin.

<Connector Apparatus According to Embodiment>

In this embodiment, a case where the technique is applied to the connector apparatus 40 interposed between the sender 10 and the waveguide cable 30 will be exemplified. It should be noted that the application is not limited to the connector apparatus 40 interposed between the sender 10 and the waveguide cable 30, and the technique is also applicable to the connector apparatus 50 interposed between the waveguide cable 30 and the receiver 20 as in the case of the connector apparatus 40.

In general, the connector apparatus is constituted of a so-called male/female pair, i.e., a pair of a first connector unit (one of male/female) and a second connector unit (the other of male/female). A connector apparatus, which includes this pair, is a connector apparatus according to a second mode. It should be noted that the connector apparatus of this embodiment is not limited to the connector apparatus according to the second mode. For example, the connector apparatus of this embodiment may be one including only one of the connector units, and this connector apparatus is a connector apparatus according to a first mode.

Hereinafter, specific examples of the connector apparatus according to the embodiment of the present disclosure, that is, the connector apparatuses according to the first and second modes will be described.

[Example 1]

Figure 3:
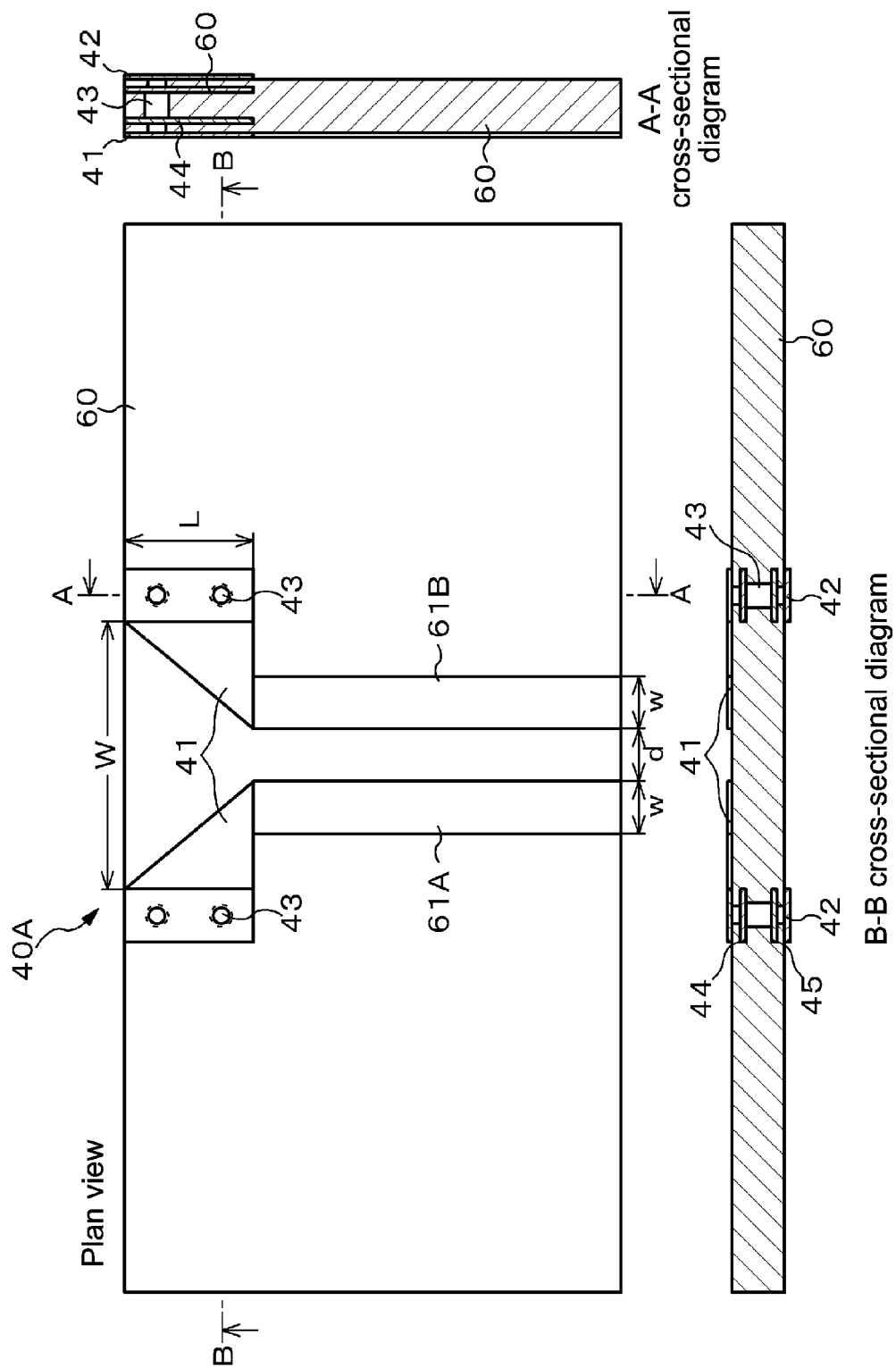
FIG. 3 is a plan view of FIG. 2, a cross-sectional diagram taken along the line A-A of FIG. 2 (A-A cross-sectional diagram), and a cross-sectional diagram taken along the line B-B of FIG. 2 (B-B cross-sectional diagram).

FIG. 2 is a perspective view schematically showing a structure of the connector apparatus according to Example 1. FIG. 3 is a plan view of FIG. 2, a cross-sectional diagram taken along the line A-A of FIG. 2 (A-A cross-sectional diagram), and a cross-sectional diagram taken along the line B-B of FIG. 2 (B-B cross-sectional diagram).

The sender 10 is provided on a circuit board 60. Here, the circuit board 60 is a plate-like dielectric board and is constituted of a print substrate which fixes electronic components, forms wiring, and structures an electronic circuit. On the circuit board 60, the two feeder wires (transmission wires) 61A and 61B formed of linear conductor foils are formed in parallel. The feeder wires 61A and 61B formed of linear conductor foils form, for example, a coplanar strip waveguide that transmits (transfer) electromagnetic waves.

An interval d between the two feeder wires 61A and 61B and a line width w of the feeder wires 61A and 61B are set based on a characteristic impedance of the waveguide cable 30. As an example, when a characteristic impedance $Z_0$ of the waveguide cable 30 is $Z_0$=150 [ohm] @60 [GHz], the interval d and the line width w are both set to be about 0.2 [mm]. Moreover, the interval d between the feeder wires 61A and 61B and the line width w of the feeder wires 61A and 61B are adjusted based on a thickness and relative permittivity of the circuit board 60.

At terminal sections of the feeder wires 61A and 61B, a connector unit (second connector unit) 40A is provided. The connector unit 40A is structured to transmit signals to an end section of the waveguide cable 30 by an electromagnetic induction. Specifically, the connector unit 40A includes a conductive opening pattern section 41 that opens in, for example, a tapered shape that gradually widens from the terminals of the feeder wires 61A and 61B toward an edge section of the circuit board 60. It should be noted that although the opening pattern section 41 is tapered herein, the shape is not limited thereto, and a shape that gradually widens stepwise toward the edge section of the circuit board 60 may be adopted, for example.

Here, in the opening pattern section 41, a length L from the terminals of the feeder wires 61A and 61B to an opening end, that is, a length L of the tapered portion is determined based on a wavelength $\lambda$ of radio waves. The wavelength $\lambda$ of radio waves used herein is a wavelength of radio waves in the circuit board 60 instead of the wavelength of radio waves in free space (in air). Since the relative permittivity of the circuit board 60 is higher than that of free space, the wavelength $\lambda$ of radio waves in the circuit board 60 becomes shorter than that of free space. Therefore, the length L of the tapered portion is determined based on the wavelength $\lambda$ of radio waves in the circuit board 60. Specifically, the length L of the tapered portion is set to a value substantially about $\lambda/4$. As an example, when a frequency of transmission target signals is 60 [GHz] and the relative permittivity of the circuit board 60 is 3.8, the length L of the tapered portion is set to be about 0.5 [mm].

In the circuit board 60, while a surface on the side on which the opening pattern section 41 is formed is used as a front surface, conductive pattern sections 42 are formed on a back surface (on other side). In addition, the opening pattern section 41 is electrically connected to the conductive pattern sections 42 via through holes 43. By forming the conductive pattern sections 42, a coupling efficiency can be raised in coupling with the connector apparatus on the waveguide cable 30 side as will be described later. In other words, a coupling loss can be made small.

Further, also inside the circuit board 60, at least one layer, two layers in this example, of conductive pattern sections 44 and 45 are formed. The opening pattern section 41 is also electrically connected to the conductive pattern sections 44 and 45 via the through holes 43. By also forming the conductive pattern sections 44 and 45 inside the circuit board 60, a coupling efficiency can be raised. In view of the coupling efficiency, the (number of) layers of the conductive pattern sections to be formed inside the circuit board 60 are more the better, and ultimately, it is favorable for the entire substrate portion below the opening pattern section 41 to be of a conductive structure.

The connector apparatus according to Example 1 described above, that is constituted of the connector unit 40A provided on the circuit board 60 side, corresponds to the connector apparatus according to the first mode. In the connector apparatus according to the first mode, electromagnetic waves (electromagnetic field distribution) transmitted by the two feeder wires 61A and 61B, that is, the coplanar strip waveguide, are enlarged in a plane (horizontal plane) of the circuit board 60 by the opening pattern section 41 and irradiated inside the waveguide cable 30. Accordingly, the connector unit 40A constituting the connector apparatus according to the first mode performs a signal transmission with the end section of the waveguide cable 30.

At the end section of the waveguide cable 30, a connector unit 40B (see FIG. 4) in a pair with the connector unit 40A is provided. The connector apparatus constituted of a combination of the connector unit (second connector unit) 40A on the circuit board 60 side and the connector unit (first connector unit) 40B on the waveguide cable 30 side corresponds to the connector apparatus according to the second mode. The connector apparatus constituted of the connector unit (first connector unit) 40B on the waveguide cable 30 side, that constitutes the connector apparatus according to the second mode, will be described as the connector apparatus according to Example 2 in the descriptions below.

[Example 2]

Figure 4:
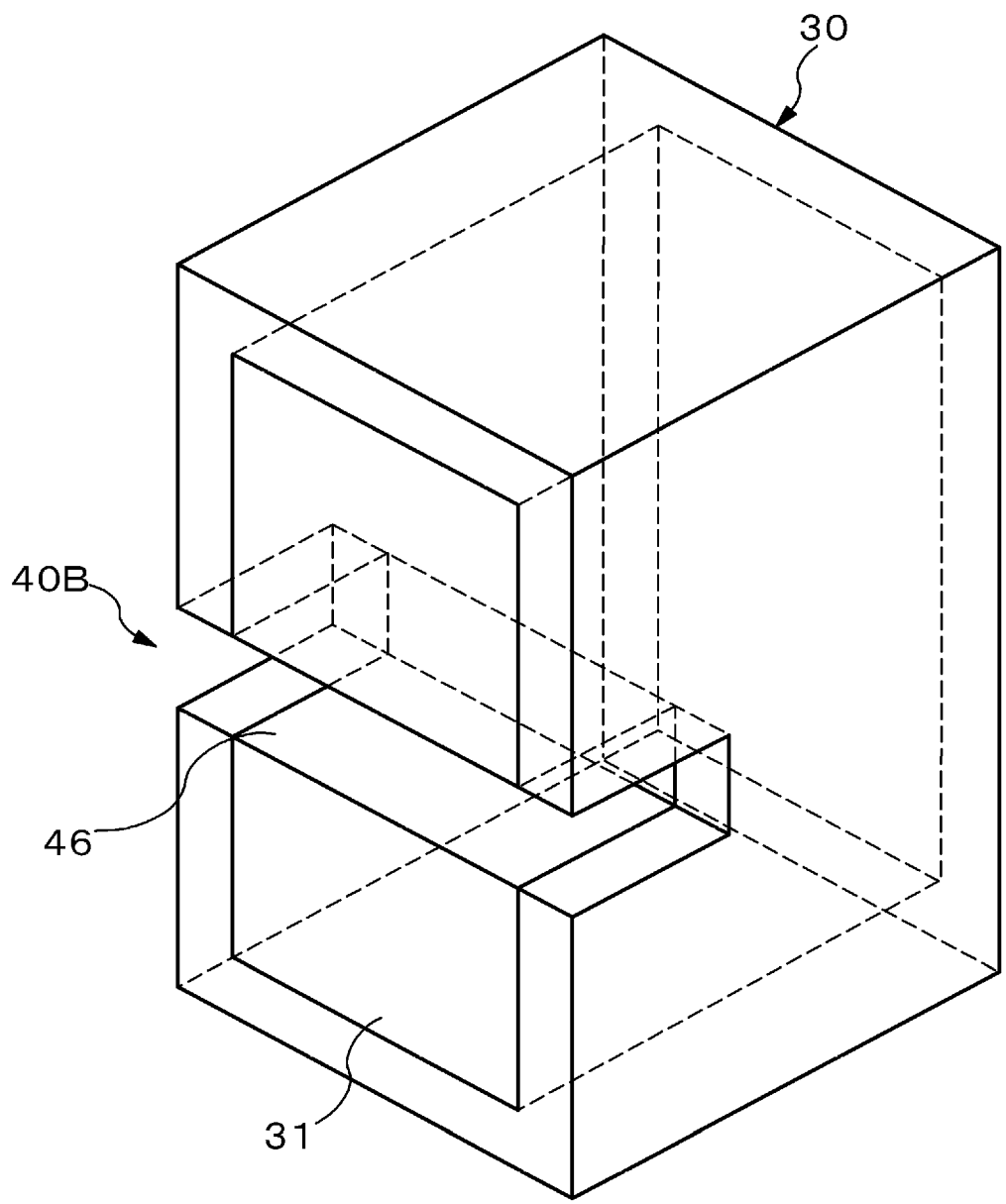
FIG. 4 is a perspective view schematically showing a connector apparatus according to Example 2.

FIG. 4 is a perspective view schematically showing the connector apparatus according to Example 2. FIG. 5A is a front view of the connector apparatus according to Example 2, and FIG. 5B is a side cross-sectional diagram of the connector apparatus according to Example 2.

In the waveguide cable 30 including the connector apparatus according to Example 2 at the end section thereof, a waveguide is formed of metal such as copper and aluminum and constitutes a dielectric waveguide including a dielectric body 31 in the waveguide, for example. It should be noted that the waveguide cable 30 is not limited to the dielectric waveguide and may be a hollow waveguide.

The waveguide cable 30 has, for example, a rectangular cross-section perpendicular to the waveguide direction. Here, the "waveguide direction" is a direction in which the electromagnetic waves propagate in the dielectric body. It should be noted that the shape of the cross-section perpendicular to the waveguide direction is not limited to a rectangle, and corners of the rectangular cross-section may be curved, or two surfaces on short sides of the rectangular cross-section may be curved. Alternatively, the shape of the cross-section perpendicular to the waveguide direction may be an oval. In the waveguide cable 30 having a rectangular cross-section, the two surfaces on a side of the long sides of the cross-section are surfaces that intersect an electric field.

At the end section of the waveguide cable 30 having a rectangular cross-section, a concave section (notched section) 46 is formed so as to intersect the two surfaces on the long sides, and the concave section 46 becomes the first connector unit (connector unit on waveguide cable 30 side) 40B. The connector unit (second connector unit) 40A on the circuit board 60 side can detachably fit in the concave section 46 of the waveguide cable 30. In other words, the second connector unit 40A couples with the first connector unit 40B such that the surface of the circuit board 60 intersects the two surfaces on the side of the long sides of the waveguide cable 30 having the rectangular cross-section, and performs a signal transmission with the first connector unit 40B using an electromagnetic induction.

For favorably performing a signal transmission between the second connector unit 40A and the first connector unit 40B, an opening width W of the opening end of the opening pattern section 41 of the second connector unit 40A is determined based on the size of the waveguide cable 30. More specifically, the opening width W of the opening pattern section 41 is set in accordance with an interval $d_1$ between inner walls on a side of the short sides of the waveguide cable 30. As an example, when the interval $d_1$ between the inner walls on the side of the short sides is 1.0

[mm] and an interval $d_2$ between inner walls on the side of the long sides is 2.0 [mm] in the waveguide cable 30, the opening width W of the opening pattern section 41 is favorably set to 1.0 [mm]. Incidentally, in the waveguide cable 30, a relative permittivity $E_r$ of the dielectric body 31 in the waveguide is 4.0.

In the connector apparatus according to the second mode that is constituted of the combination of the first connector unit 40B and the second connector unit 40A, the connector units 40A and 40B can be coupled by merely inserting (fitting) the opening pattern section 41 of the circuit board 60 into the concave section 46 of the waveguide cable 30. The coupling of the connector units 40A and 40B is an electromagnetic coupling. In other words, the signal transmission between the second connector unit 40A and the first connector unit 40B is performed using an electromagnetic induction.

Figure 6:
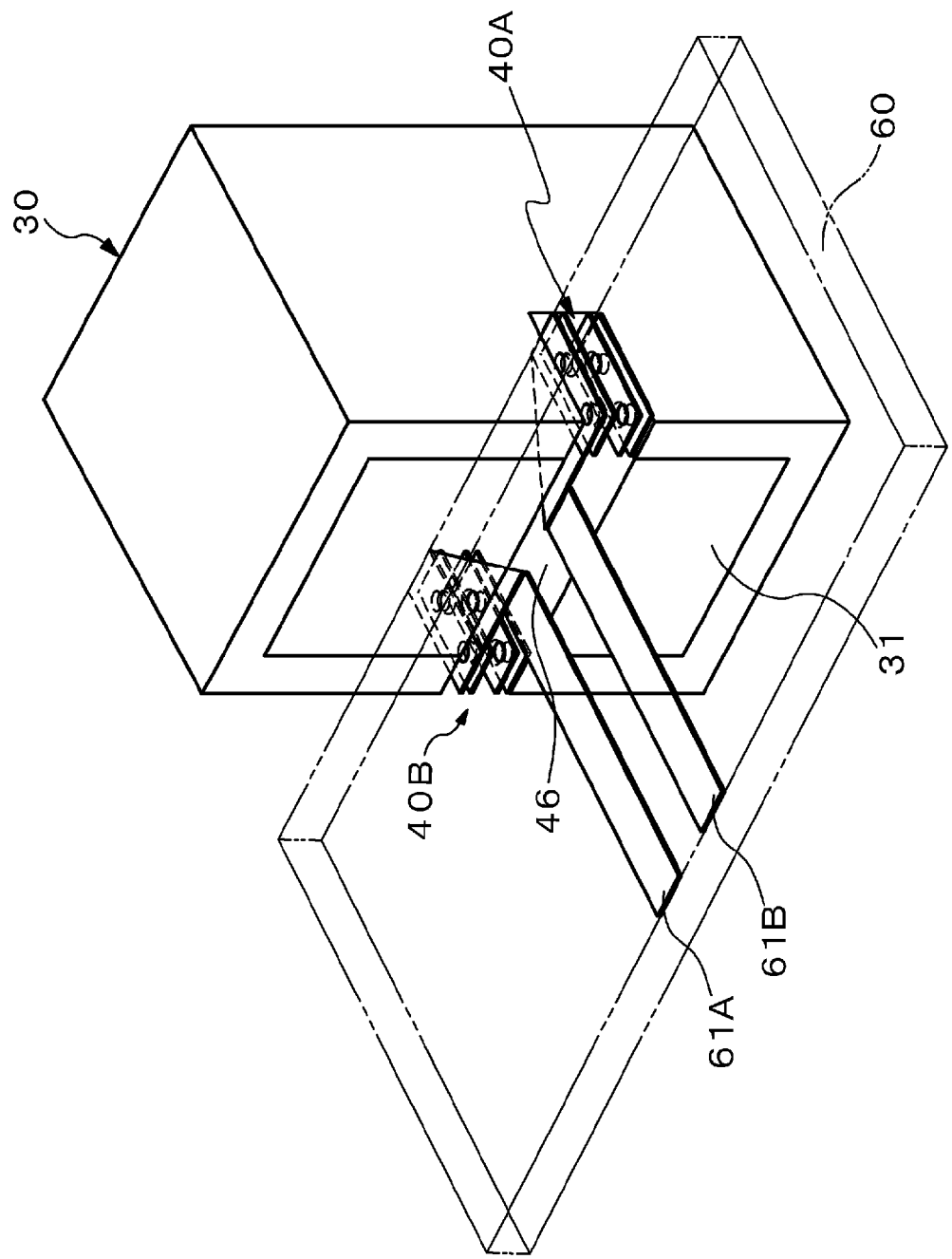
FIG. 6 is a perspective view showing a coupling section of a first connector unit and a second connector unit.

The state where the first connector unit 40B and the second connector unit 40A are coupled is shown in FIGS. 6, 7A, and 7B. FIG. 6 is a perspective view showing a coupling section of the first connector unit 40B and the second connector unit 40A. FIG. 7A is a plan view showing the coupling section of the first connector unit 40B and the second connector unit 40A, and FIG. 7B is a side cross-sectional diagram of the coupling section of the first connector unit 40B and the second connector unit 40A.

The concave section 46 of the waveguide cable 30 is set with a depth enough for the opening pattern section 41 of the circuit board 60 to be fully inserted as shown in FIGS. 7A and 7B. Further, a height of the opening of the concave section 46 (height along long sides) is set in accordance with the thickness of the circuit board 60 including the opening pattern section 41. At this time, it is favorable for a gap between the inner walls of the concave section 46 of the waveguide cable 30 and the circuit board 60 to be as small as possible. It should be noted that since the coupling between the first connector unit 40B and the second connector unit 40A is an electromagnetic coupling, even when there are gaps to a certain degree between the inner walls of the concave section 46 of the waveguide cable 30 and the circuit board 60, there is no problem regarding the signal transmission.

Here, with reference to FIGS. 8A, 8B, 9A, and 9B, coupling characteristics of the first connector unit 40B and the second connector unit 40A will be discussed. In the coupling characteristics shown in FIGS. 8B and 9B, S11 and S22 are reflection coefficients of an S parameter, and S21 is a transmission coefficient of the S parameter.

As shown in FIG. 8A, when there is no gap between the inner walls of the concave section 46 of the waveguide cable 30 and the circuit board 60 (gap is 0 [mm]), the band is significantly wide and a coupling loss is small. Specifically, as is apparent from the coupling characteristics shown in FIG. 8B, the band is as wide as about 43 [GHz] (43-86 [GHz]) (69 [%] of center frequency of 65 [GHz]), and the coupling loss is as small as 0.2 [dB] @65 [GHz] (see S21).

As shown in FIG. 9A, even when there are gaps of about 0.1 [mm] between the inner walls of the concave section 46 of the waveguide cable 30 and the circuit board 60, deterioration of the coupling characteristics is small. Specifically, as is apparent from the coupling characteristics shown in FIG. 9B, the band is slightly narrowed to about 38 [GHz] (41-79 [GHz]) (63 [%] of center frequency of 60 [GHz]), and the coupling loss slightly deteriorates to about 0.29 [dB] @60 [GHz] (see S21).

As is apparent from the descriptions above, the gap between the inner walls of the concave section 46 of the waveguide cable 30 and the circuit board 60 is smaller the better, but even when there are gaps to a certain degree, the signal transmission can be performed without a problem since the deterioration of the coupling characteristics is small.

(Operation and Effect of this Embodiment)

As described above, in the wireless transmission system of the present disclosure, the detachable connector apparatus according to the present disclosure is interposed between the feeder wires 61A and 61B on the circuit board 60 and the waveguide cable 30. Therefore, the circuit board 60 side and the waveguide cable 30 side can be arbitrarily connected and disconnected to/from each other.

Further, the connector apparatus according to the present disclosure has a structure of changing the high-frequency signals transmitted through the feeder wires 61A and 61B on the circuit board 60 into an electric field distribution in the horizontal direction of the waveguide cable 30 by the tapered conductive opening pattern section 41 for coupling. With this structure, a connector apparatus having a wide band and a small coupling loss even when the metal section of the waveguide cable 30 and the feeder wires 61A and 61B on the circuit board 60 are not in contact with each other can be realized. In addition, since the orientation of the electric field is set on the waveguide cable 30 by the opening pattern section 41, the coupling efficiency is high, and any size of waveguide cable 30 can be used.

Moreover, since the metal section of the waveguide cable 30 can be coupled in a non-contact state, a connector apparatus having a waterproof structure can be realized. Further, since the coupling between the second connector unit 40A and the first connector unit 40B is an electromagnetic coupling, a connector apparatus that is invulnerable to a positional deviation of the connector apparatus, that is, a relative positional deviation of the second connector unit 40A and the first connector unit 40B can be realized. Furthermore, since the tapered conductive opening pattern section 41 can be formed only by a pattern formation on the circuit board 60, that is, a print substrate, there is an advantage that the connector apparatus can be produced at low costs.

[Modified Example]

Figure 10:
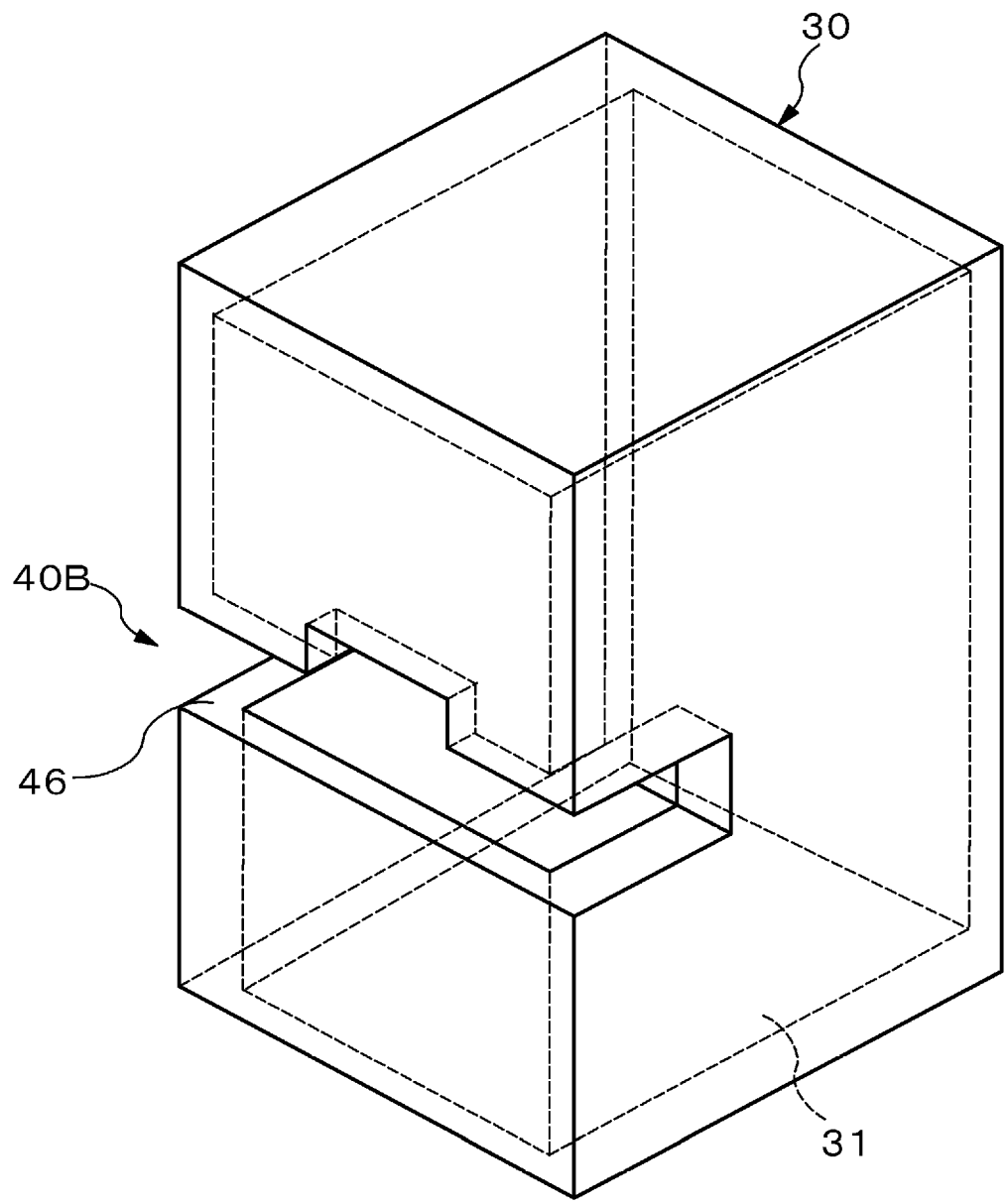
FIG. 10 is a perspective view showing a modified example of the connector apparatus according to Example 2.

In Example 2, the waveguide cable 30 has the structure in which the surface thereof on the side that couples with the second connector unit 40A is exposed, that is, the dielectric body 31 is exposed. In contrast, as shown in FIG. 10, a structure of the waveguide cable 30 in which portions other than the opening section, where the first connector unit 40B and the second connector unit 40A are coupled, are blocked by metal may also be adopted. By adopting the structure in which portions other than the opening section are blocked by metal as described above, the radiation of radio waves from inside the waveguide cable 30 (unnecessary radiation) can be made small, and it becomes difficult for the waveguide cable 30 to be affected from outside. As the metal used for blocking, metal the same as that used for the waveguide, that is, metal such as copper and aluminum is favorable.

[Example 3]

Figure 11:
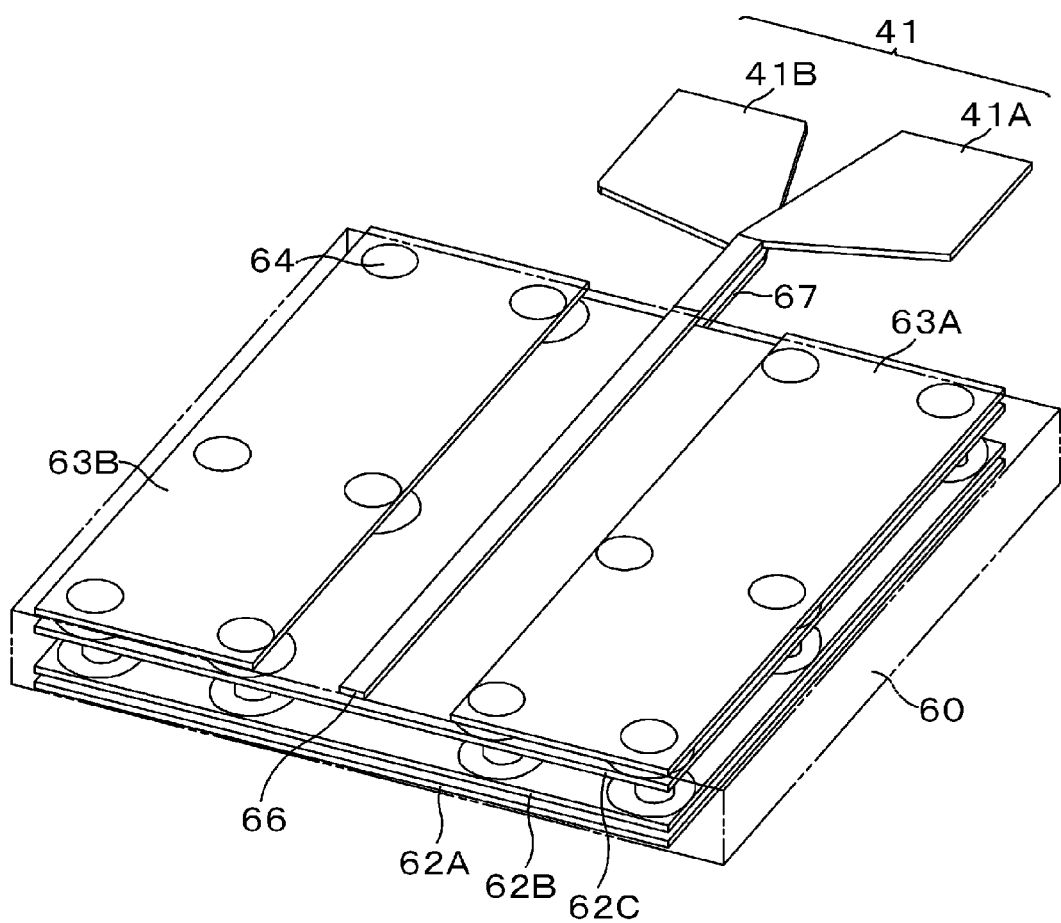
FIG. 11 is a perspective view schematically showing a structure of a connector apparatus according to Example 3.

FIG. 11 is a perspective view schematically showing a structure of a connector apparatus according to Example 3. FIG. 12A is a front view of the connector apparatus according to Example 3, and FIG. 12B is a side cross-sectional diagram of the connector apparatus according to Example 3.

In the connector apparatus according to Example 1, the feeder wires on the circuit board 60 for transmitting high-frequency signals form a coplanar strip waveguide. In contrast, in the connector apparatus according to Example 3, the feeder wires on the circuit board 60 for transmitting high-frequency signals form a microstrip line.

Inside the circuit board 60, three rectangular conductive plates 62A, 62B, and 62C are laminated, for example. In addition, two conductive plates 63A and 63B are provided on the circuit board 60 while being spaced apart from each other at the center portion. The conductive plates 62A, 62B, and 62C and the conductive plates 63A and 63B are electrically connected via through holes 64. The plurality of through holes 64, 12 in this example, are provided. The conductive plates 62A, 62B, and 62C and the conductive plates 63A and 63B are set to a ground (GND) potential.

At the center portion of the circuit board 60, a microstrip line 66 is provided. At a tip end section (terminal end section) of the microstrip line 66, a first pattern section 41A for forming the opening pattern section 41 is provided. In addition, a second pattern section 41B is provided so as to overlap the first pattern section 41A. The second pattern section 41B is electrically connected to the conductive plate 62C at the top, for example, via a ground wire 67.

Since the first pattern section 41A and the second pattern section 41B overlap each other, for example, the tapered opening pattern section 41 that gradually widens from the terminal of the microstrip line 66 toward the edge section of the circuit board 60 is formed. It should be noted that although the opening pattern section 41 is tapered herein, the shape is not limited thereto, and a shape that gradually widens stepwise toward the edge section of the circuit board 60 may be adopted instead.

Here, since the conductive plates 63A and 63B provided above the conductive plate 62C at the top are grounded and sandwich the microstrip line 66, an operation of preventing radio waves transmitted through the microstrip line 66 from leaking can be obtained. Therefore, particularly when a plurality of connector apparatuses each including the microstrip line 66 and the opening pattern section 41 are provided while being aligned, there is an advantage that mutual interferences of radio waves among the connector apparatuses can be prevented from occurring by the operation of the conductive plates 63A and 63B.

The size of the opening pattern section 41, that is, the sizes of the first pattern section 41A and the second pattern section 41B, and the like, can be set similarly as in the case of the opening pattern section 41 in the connector apparatus according to Example 1. Moreover, also the operation of the opening pattern section 41 is basically the same as the connector apparatus according to Example 1. On the other hand, as the connector apparatus on the waveguide cable 30 side, the connector apparatus having the structure shown in FIG. 4 or the connector apparatus having the structure shown in FIG. 10 can be used.

The connector apparatus according to Example 3 having the structure described above, that is, the connector apparatus in which the feeder wire on the circuit board 60 is constituted of a microstrip line, bears the same operation and effect as the connector apparatus according to Example 1 in which the feeder wires on the circuit board 60 form a coplanar strip waveguide. In other words, since high-frequency signals transmitted through the microstrip line are changed into an electric field distribution in the horizontal direction of the waveguide cable 30 by the tapered conductive opening pattern section 41 for coupling, a connector apparatus having a wide band and a small coupling loss can be realized. In addition, since the orientation of the electric field is set on the waveguide cable 30 by the opening pattern section 41, the coupling efficiency is high, and any size of waveguide cable 30 can be used.

Moreover, since the metal section of the waveguide cable 30 can be coupled in a non-contact state, a connector apparatus having a waterproof structure can be realized. Further, since the coupling between the second connector unit 40A and the first connector unit 40B is an electromagnetic coupling, a connector apparatus that is invulnerable to a positional deviation of the connector apparatus, that is, a relative positional deviation of the second connector unit 40A and the first connector unit 40B can be realized. Furthermore, since the tapered conductive opening pattern section 41 can be formed only by a pattern formation on the circuit board 60, that is, a print substrate, there is an advantage that the connector apparatus can be produced at low costs.

It should be noted that the present disclosure may also take the following structures.

[A01] <<Connector Apparatus . . . First Mode>>

A connector apparatus, including a connector unit that is provided at a terminal section of a feeder wire formed on a circuit board and is detachable from an end section of a waveguide cable, the connector unit being structured to perform a signal transmission with the end section of the waveguide cable by an electromagnetic induction.

[A02] The connector apparatus according to [A01], in which the waveguide cable has a concave section formed at the end section thereof, and in which the connector unit can detachably fit in the concave section of the waveguide cable.

[A03] The connector apparatus according to [A01] or [A02], in which the connector unit includes a conductive opening pattern section that gradually widens from the terminal of the feeder wire toward an edge section of the circuit board.

[A04] The connector apparatus according to [A03], in which the opening pattern section is tapered.

[A05] The connector apparatus according to any one of [A01] to [A04], in which an opening pattern section is structured such that a length from the terminal of the feeder wire to an opening end is determined based on a wavelength of radio waves in the circuit board.

[A06] The connector apparatus according to [A05], in which the opening pattern section is structured such that the length from the terminal of the feeder wire to the opening end becomes substantially ¼ the wavelength of radio waves in the circuit board.

[A07] The connector apparatus according to any one of [A01] to [A06], in which an opening pattern section is structured such that an opening width of an opening end is determined based on a size of the waveguide cable.

[A08] The connector apparatus according to any one of [A01] to [A07], in which two feeder wires are provided, and in which an interval between the two feeder wires and a line width of the feeder wires are set based on a characteristic impedance of the waveguide cable.

[A09] The connector apparatus according to [A08], in which interval between the two feeder wires and the line width of the feeder wires are set based on a thickness and relative permittivity of the circuit board.

[A10] The connector apparatus according to [A08] or [A09], in which the two feeder wires form a coplanar strip waveguide.

[A11] The connector apparatus according to any one of [A01] to [A10],
in which an opening pattern section is electrically connected, via a through hole, to a conductive pattern section of the circuit board formed on the other side of a side on which the opening pattern section is formed.

[A12] The connector apparatus according to any one of [A01] to [A07],
in which the feeder wire forms a microstrip line.

[A13] The connector apparatus according to any one of [A01] to [A12],
in which the connector unit transmits a high-frequency signal to the end section of the waveguide cable.

[A14] The connector apparatus according to [A13],
in which the high-frequency signal is a millimeter waveband signal.

[B01] <<Connector Apparatus . . . Second Mode>>
A connector apparatus, including:
a first connector unit provided at an end section of a waveguide cable; and
a second connector unit that is provided at a terminal section of a feeder wire formed on a circuit board and is detachable from the first connector unit,
the second connector unit being structured to perform a signal transmission with the first connector unit by an electromagnetic induction.

[B02] The connector apparatus according to [B01],
in which the waveguide cable has a rectangular cross-section perpendicular to a waveguide direction, and two surfaces on a side of long sides of the cross-section are surfaces that intersect an electric field, and
in which the second connector unit couples with the first connector unit such that a surface of the circuit board intersects the two surfaces on the side of the long sides.

[B03] The connector apparatus according to [B02],
in which the first connector unit is constituted of a concave section formed at the end section of the waveguide cable so as to intersect the two surfaces on the side of the long sides, and
in which the second connector unit can detachably fit in the concave section of the waveguide cable.

[B04] The connector apparatus according to any one of [B01] to [B03],
in which the waveguide cable excluding an opening section that couples the first connector unit and the second connector unit is blocked by metal.

[B05] The connector apparatus according to any one of [B01] to [B04],
in which the second connector unit includes a conductive opening pattern section that gradually widens from the terminal of the feeder wire toward an edge section of the circuit board.

[B06] The connector apparatus according to [B05],
in which the opening pattern section is tapered.

[B07] The connector apparatus according to any one of [B01] to [B06],
in which an opening pattern section is structured such that a length from the terminal of the feeder wire to an opening end is determined based on a wavelength of radio waves in the circuit board.

[B08] The connector apparatus according to [B07],
in which the opening pattern section is structured such that the length from the terminal of the feeder wire to the opening end becomes substantially ¼ the wavelength of radio waves in the circuit board.

[B09] The connector apparatus according to any one of [B01] to [B08],
in which an opening pattern section is structured such that an opening width of an opening end is determined based on a size of the waveguide cable.

[B10] The connector apparatus according to any one of [B01] to [B09],
in which two feeder wires are provided, and
in which an interval between the two feeder wires and a line width of the feeder wires are set based on a characteristic impedance of the waveguide cable.

[B11] The connector apparatus according to [B10],
in which the interval between the two feeder wires and the line width of the feeder wires are set based on a thickness and relative permittivity of the circuit board.

[B12] The connector apparatus according to [B10] or [B11],
in which the two feeder wires form a coplanar strip waveguide.

[B13] The connector apparatus according to any one of [B01] to [B12],
in which an opening pattern section is electrically connected, via a through hole, to a conductive pattern section of the circuit board formed on the other side of a side on which the opening pattern section is formed.

[B14] The connector apparatus according to any one of [B01] to [B09],
in which the feeder wire forms a microstrip line.

[B15] The connector apparatus according to any one of [B01] to [B14],
in which the second connector unit transmits a high-frequency signal to the first connector unit.

[B16] The connector apparatus according to [B15],
in which the high-frequency signal is a millimeter waveband signal.

[C01] <<Wireless Transmission System>>
A wireless transmission system, including:
a sender that transmits a high-frequency signal;
a receiver that receives the high-frequency signal;
a waveguide cable that transmits the high-frequency signal between the sender and the receiver; and
a connector apparatus that connects at least one of the sender and the receiver with the waveguide cable,
the connector apparatus including
a first connector unit provided at an end section of the waveguide cable, and
a second connector unit that is provided at a terminal section of a feeder wire formed on a circuit board and is detachable from the first connector unit in at least one of the sender and the receiver,
the second connector unit being structured to perform a signal transmission with the first connector unit by an electromagnetic induction.

[C02] The wireless transmission system according to [C01],
in which the waveguide cable has a rectangular cross-section perpendicular to a waveguide direction, and two surfaces on a side of long sides of the cross-section are surfaces that intersect an electric field, and
in which the second connector unit couples with the first connector unit such that a surface of the circuit board intersects the two surfaces on the side of the long sides.

[C03] The connector apparatus according to [C02],
in which the first connector unit is constituted of a concave section formed at the end section of the waveguide cable so as to intersect the two surfaces on the side of the long sides, and
in which the second connector unit can detachably fit in the concave section of the waveguide cable.

[C04] The connector apparatus according to any one of [C01] to [C03],
in which the waveguide cable excluding an opening section that couples the first connector unit and the second connector unit is blocked by metal.

[C05] The connector apparatus according to any one of [C01] to [C04],
in which the second connector unit includes a conductive opening pattern section that gradually widens from the terminal of the feeder wire toward an edge section of the circuit board.

[C06] The connector apparatus according to [C05],
in which the opening pattern section is tapered.

[C07] The connector apparatus according to any one of [C01] to [C06],
in which an opening pattern section is structured such that a length from the terminal of the feeder wire to an opening end is determined based on a wavelength of radio waves in the circuit board.

[C08] The connector apparatus according to [C07],
in which the opening pattern section is structured such that the length from the terminal of the feeder wire to the opening end becomes substantially ¼ the wavelength of radio waves in the circuit board.

[C09] The connector apparatus according to any one of [C01] to [C08],
in which an opening pattern section is structured such that an opening width of an opening end is determined based on a size of the waveguide cable.

[C10] The connector apparatus according to any one of [C01] to [C09],
in which two feeder wires are provided, and
in which an interval between the two feeder wires and a line width of the feeder wires are set based on a characteristic impedance of the waveguide cable.

[C11] The connector apparatus according to [C10],
in which the interval between the two feeder wires and the line width of the feeder wires are set based on a thickness and relative permittivity of the circuit board.

[C12] The connector apparatus according to [C10] or [C11],
in which the two feeder wires form a coplanar strip waveguide.

[C13] The connector apparatus according to any one of [C01] to [C12],
in which an opening pattern section is electrically connected, via a through hole, to a conductive pattern section of the circuit board formed on the other side of a side on which the opening pattern section is formed.

[C14] The connector apparatus according to any one of [C01] to [C09],
in which the feeder wire forms a microstrip line.

[C15] The connector apparatus according to any one of [C01] to [C14],
in which the second connector unit transmits a high-frequency signal to the first connector unit.

[C16] The connector apparatus according to [C15],
in which the high-frequency signal is a millimeter waveband signal.

DESCRIPTION OF SYMBOLS 1 wireless transmission system
10 sender
11 signal generator
20 receiver
21 signal decoder
30 waveguide cable
31 dielectric body
40, 50 connector apparatus
40A, 40B connector unit
41 opening pattern section
41A first pattern section
41B second pattern section
42, 44, 45 conductive pattern section
43, 64 through hole
44 conductive pattern
46 concave section (notched section)
60 circuit board
61A, 61B feeder wire
62A, 62B, 62C conductive plate
63A, 63B conductive plate
66 microstrip line
67 ground wire
100 first communication apparatus
111 oscillator
112, 212 multiplier
113, 211, 213 buffer
200 second communication apparatus

What is claimed is:

1. A connector apparatus, comprising:
    a connector unit,
        wherein the connector unit is provided at a terminal section of a feeder wire formed on a circuit board,
        wherein the connector unit is detachable from an end section of a waveguide cable,
        wherein the connector unit is structured to perform a signal transmission with the end section of the waveguide cable by an electromagnetic induction,
        wherein an opening pattern section of the connector unit is formed on a first side of the circuit board,
        wherein the opening pattern section is electrically connected, via a through hole, to a conductive pattern section formed on a second side of the circuit board, and
        wherein the opening pattern section gradually widens from the terminal of the feeder wire toward an edge section of the circuit board.

2. The connector apparatus according to claim 1, wherein the waveguide cable has a concave section formed at the end section thereof, and
wherein the connector unit can detachably fit in the concave section of the waveguide cable.

3. The connector apparatus according to claim 1, wherein the opening pattern section is tapered.

4. The connector apparatus according to claim 1,
wherein the opening pattern section is structured such that a length from the terminal of the feeder wire to an opening end is determined based on a wavelength of radio waves in the circuit board.

5. The connector apparatus according to claim 4,
wherein the opening pattern section is structured such that the length from the terminal of the feeder wire to the opening end becomes substantially ¼ the wavelength of radio waves in the circuit board.

6. The connector apparatus according to claim 1,
wherein an opening pattern section is structured such that an opening width of an opening end is determined based on a size of the waveguide cable.

7. The connector apparatus according to claim 1, wherein two feeder wires are provided, and wherein an interval between the two feeder wires and a line width of the feeder wires are set based on a characteristic impedance of the waveguide cable.

8. The connector apparatus according to claim 7, wherein the interval between the two feeder wires and the line width of the feeder wires are set based on a thickness and relative permittivity of the circuit board.

9. The connector apparatus according to claim 7, wherein the two feeder wires form a coplanar strip waveguide.

10. The connector apparatus according to claim 1, wherein the feeder wire forms a microstrip line.

11. The connector apparatus according to claim 1, wherein the connector unit transmits a high-frequency signal to the end section of the waveguide cable.

12. The connector apparatus according to claim 11, wherein the high-frequency signal is a millimeter waveband signal.

13. A connector apparatus, comprising:
a first connector unit provided at an end section of a waveguide cable; and
a second connector unit that is provided at a terminal section of a feeder wire formed on a circuit board,
wherein the second connector unit is detachable from the first connector unit,
wherein the second connector unit includes an opening pattern section formed on a first side of a circuit board,
wherein the opening pattern section is electrically connected to a conductive pattern section formed on a second side of the circuit board by a through hole,
wherein the second connector unit is structured to perform a signal transmission with the first connector unit by an electromagnetic induction,
wherein the waveguide cable has a rectangular cross-section perpendicular to a waveguide direction, and two surfaces on a side of long sides of the cross-section are surfaces that intersect an electric field, and
wherein the second connector unit couples with the first connector unit such that a surface of the circuit board intersects the two surfaces on the side of the long sides.

14. The connector apparatus according to claim 13, wherein the first connector unit is constituted of a concave section formed at the end section of the waveguide cable so as to intersect the two surfaces on the side of the long sides, and
wherein the at least a portion of the opening pattern section and the conductive pattern section of the second connector unit can detachably fit in the concave section of the waveguide cable.

15. The connector apparatus according to claim 13, wherein the waveguide cable excluding an opening section that couples the first connector unit and the second connector unit is blocked by metal.

16. A wireless transmission system, comprising:
a sender that transmits a high-frequency signal;
a receiver that receives the high-frequency signal;
a waveguide cable that transmits the high-frequency signal between the sender and the receiver; and
a connector apparatus that connects at least one of the sender and the receiver with the waveguide cable,
the connector apparatus including:
a first connector unit provided at an end section of the waveguide cable; and
a second connector unit provided at a terminal section of a feeder wire formed on a circuit board, wherein the second connector unit includes:
an opening pattern section formed on a first side of the circuit board;
a conductive pattern section formed on a second side of the circuit board; and
a through hole, wherein the through hole electrically connects the opening pattern section and the conductive pattern section,
wherein the second conductor unit is detachable from the first connector unit in at least one of the sender and the receiver, and
wherein the second connector unit is structured to perform a signal transmission with the first connector unit by an electromagnetic induction,
wherein the feeder wire formed on the circuit board includes two wires, wherein the opening pattern section gradually widens from a first point adjacent a terminal inside edge of a first one of the two wires and a second point adjacent a terminal inside edge of a second one of the two wires toward an edge of the circuit board,
wherein the conductive pattern section includes a first conductive pattern section electrically connected by at least a first through hole to a first side of the opening pattern section, and
wherein the conductive pattern section includes a second conductive pattern section electrically connected by at least a second through hole to a second side of the opening pattern section.

17. The wireless transmission system according to claim 16, wherein the high-frequency signal is a millimeter waveband signal.

* * * * *